United States Patent [19]

Kasper

[11] 4,199,942

[45] Apr. 29, 1980

[54] LOAD SENSING CONTROL FOR HYDRAULIC SYSTEM

[75] Inventor: Leslie J. Kasper, Marshall, Mich.

[73] Assignee: Eaton Corporation, Cleveland, Ohio

[21] Appl. No.: 946,915

[22] Filed: Sep. 28, 1978

[51] Int. Cl.[2] ........................ F15B 11/16; F16H 39/46

[52] U.S. Cl. ........................................ 60/420; 60/445; 60/452; 60/484

[58] Field of Search ................. 60/420, 445, 452, 484, 60/DIG. 2; 91/446

[56] References Cited

U.S. PATENT DOCUMENTS

| | | | |
|---|---|---|---|
| 3,455,210 | 7/1969 | Allen | 91/446 |
| 3,486,334 | 12/1969 | Miller | 60/450 |
| 3,908,375 | 9/1975 | Young | 60/445 X |
| 3,971,216 | 7/1976 | Miller | 60/445 |
| 3,990,236 | 11/1976 | Johnson | 60/428 |
| 4,011,721 | 3/1977 | Yip | 60/445 |
| 4,044,786 | 8/1977 | Yip | 60/421 X |

*Primary Examiner*—Edgar W. Geoghegan

*Attorney, Agent, or Firm*—R. J. McCloskey; J. Yakimow; L. Kasper

[57] ABSTRACT

A load sensing hydraulic system is disclosed of the type in which a load signal is communicated from downstream of a main flow control orifice to a device which is operable to vary the fluid delivery rate in response to changes in the load signal. Disposed in the load signal conduit is a load signal modulating valve which, in one position, communicates the load signal, substantially unchanged, to the variable fluid source. In another position of the modulating valve, the load signal chamber of the variable fluid source is drained to tank, while in intermediate positions of the modulating valve, a portion of the load signal is communicated to the variable fluid source, and a portion is bled to tank. Modulation of a load signal permits flow control in an hydraulic system, independent of the position or movement of the main spool valve. The input to the modulating valve may be manual or electric, and if electric, may be remote, or may be automatic in response to certain predetermined system conditions.

11 Claims, 3 Drawing Figures

LOAD SENSING CONTROL FOR HYDRAULIC SYSTEM

BACKGROUND OF THE DISCLOSURE

The present invention relates to controls for an hydraulic system, and more particularly, to load sensing controls which permit the system to respond to a variety of types of input.

In recent years, the growing use of hydraulic systems has resulted in an increasing demand for more sophisticated and versatile controls for such systems. Quite naturally, such demand for better controls has resulted in attempts to apply electronic circuit technology as the logic input to control hydraulic systems.

One of the major difficulties in the use of electrical and electronic circuitry to control hydraulics is the selection of an appropriate interface between the electrical portion of the system and the hydraulic portion. One known type of interface is an electrically-actuated solenoid valve. However, if the hydraulic flow rates through the system are substantial, the flow forces acting on the solenoid valve make it necessary to use a fairly large, expensive solenoid having an excessive current draw. Therefore, the weight, expense and power requirements result in limited usefulness for such an interface.

Another known type of hydraulic-electrical interface is the nozzle flapper valve arrangement, which typically is used to generate a pair of pilot pressures, which bias the opposite ends of a main control spool. The precision required in producing a nozzle flapper valve having a reproducible, linear relationship between electrical input and hydraulic flow makes such an arrangement too expensive for a large segment of the hydraulic control market.

Accordingly, it is an object of the present invention to provide an hydraulic system which is adaptable to the use of electronic control logic at a cost which makes its potential use more widespread.

It is a related object of the present invention to provide an improved interface means to permit the use of electrical and electronic controls for hydraulic circuits.

As the use of hydraulic systems has grown, the recent interest in energy conservation has resulted in the development and adoption of load sensing hydraulics, i.e., hydraulic systems in which the load imposed on the system is sensed and the "load signal" is used to match the output of the fluid delivery source to the demand for fluid. The prior art has generally utilized the load sensing capabilities of hydraulic circuits for the fairly limited purpose described above, but have not used load signals, whether natural or synthetic, as a major element in the overall system control.

Accordingly, it is an object of the present invention to provide a load sensing hydraulic system in which the load signal is utilized as part of the main control, and as part of the electrical-hydraulic interface.

The above and other objects of the present invention are accomplished by the provision of an improved hydraulic system for controlling the flow of fluid from a variable fluid delivery source to a fluid actuated device. The system includes main control means disposed in series flow relationship between the fluid source and the fluid actuated device, the main control means including a main flow orifice. The flow through the main control means is normally a function of the area of the main flow orifice, with the pressure drop across the orifice normally being substantially constant. The variable fluid delivery source includes a load signal chamber and a means responsive to changes in the fluid pressure within the load signal chamber to vary the delivery of the fluid source. The system further includes means providing a load signal representative of the load on the fluid actuated device and a means communicating the load signal to the load signal chamber.

The improvement comprises a valve means disposed within the load signal communicating means. The valve means includes a first port in fluid communication with the load signal providing means, a second port in fluid communication with the load signal chamber, and a third port in fluid communication with a source of reference fluid, such as the system reservoir. The valve means includes a movable valve member having a first position permitting fluid communication between the first and second ports while isolating the third port. The movable valve member has at least one position permitting partial fluid communication between the first port and the second port and between the first port and the third port, the movement of the movable valve member being independent of the operation of the main control means.

In accordance with another aspect of the present invention, the movable valve member has a second position permitting fluid communication between the second and third ports while isolating the first port, and the position of the movable valve member is infinitely variable between the first and second positions whereby the pressure in the load signal chamber is infinitely variable between the load signal pressure and the reference fluid pressure, respectively.

DESCRIPTION OF THE PREFERRED EMBODIMENTS

Figure 1:
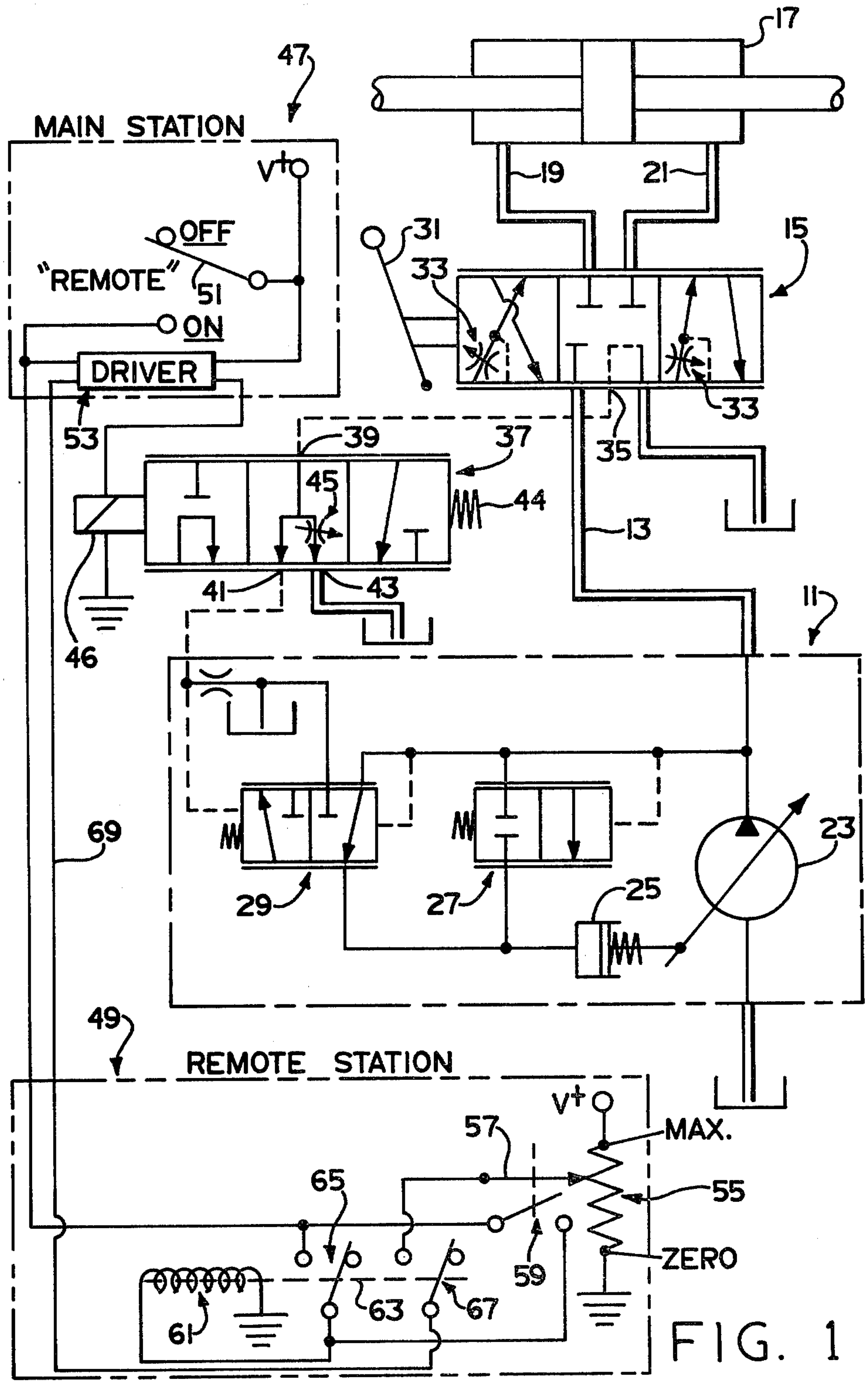
FIG. 1 is a schematic view of a preferred embodiment of the present invention, permitting remote control of an hydraulic system.

Referring now to the drawings, which are not intended to limit the present invention, FIG. 1 illustrates schematically an hydraulic system which may be controlled remotely in accordance with the present invention. The basic system includes a load sensing pump, generally designated 11, which pumps pressurized fluid through a conduit 13 to a conventional three position, four way flow control valve, generally designated 15. The flow control valve 15 is in fluid communication with a fluid actuated cylinder 17 through a pair of conduits 19 and 21.

The load sensing pump 11 includes a variable displacement pump element 23, the displacement of which is varied by a stroke control mechanism 25. The fluid pressure in the stroke control mechanism 25 is controlled by a pressure compensator valve 27 and a flow compensator valve 29, in a manner well known in the art, and which forms no part of the present invention.

The flow control valve 15 is manually movable, by means of a handle 31, from the neutral position shown in FIG. 1 to either of a pair of actuated positions, selectively communicating pressurized fluid from the conduit 13 to one of the conduits 19 or 21. In either of the actuated positions, the flow control valve 15 defines a variable, main flow control orifice 33. The flow control valve 15 is of the type referred to as "load sensing", i.e., the valve is constructed to communicate to a load signal port 35 a pressure signal representative of the load imposed on the fluid cylinder 17. As is now well known in the art, the load signal port 35 is typically in fluid communication with the main flow path at a point immediately downstream of the main flow control orifice 33.

A conventional, load sensing flow control system, made in accordance with the teachings of the prior art, would have consisted essentially of the elements described above, with the load signal port 35 connected in direct fluid communication with the flow compensator valve 29 of the load sensing pump 11. In such a prior art system, the fluid pressure biasing the compensator valve 29 is always substantially equal to the fluid pressure at the load sensing port 35, such that the rate of fluid flow through the variable orifice 33 is always, under normal operating conditions, directly proportional to the size of the orifice 33. The size of the variable flow control orifice 33 is, in turn, dependent solely upon the position of the handle 31, and, as is well known to those skilled in the art, remote control of the position of the handle 31 and the variable orifice 33 has been difficult and expensive.

An essential feature of the present invention is the inclusion of a load signal modulating valve 37 having a first port 39 in fluid communication with the load signal port 35, a second port 41, and a third port 43. The second port 41 is in fluid communication with the compensator valve 29, while the third port 43 is in fluid communication with the system reservoir. In the embodiment of FIG. 1, the modulating valve 37 is illustrated as being infinitely variable, and is biased by a spring 44 toward a position in which there is substantially unrestricted fluid communication between the first port 39 and the second port 41, while the third port 43 is isolated. In the opposite position of the modulating valve 37, the first port 39 is isolated, while there is substantially unrestricted fluid communication between the second port 41 and the third port 43.

In between the two extreme positions of the modulating valve 37 is the position illustrated in FIG. 1 in which the first port 39 is in fluid communication with the second port 41, but is also in fluid communication with the third port 43, through a variable orifice 45, the area of which varies with the infinitely variable movement of the modulating valve 37. As will become apparent from a further reading and understanding of the present specification, the third port 43 is connected to the system reservoir, in the subject embodiment, primarily for the purpose of simplicity. The third port 43 may be connected to any source of "reference fluid", i.e., a source of fluid having a substantially constant, predictable pressure.

It should also be understood that the manner of moving the modulating valve 37, in opposition to the biasing force of the spring 44, is not a critical feature of the present invention. In the embodiment of FIG. 1, movement of the modulating valve 37 is accomplished by an electrically-actuated proportional solenoid 46, such that the axial position of the valve 37 is proportional to the voltage level of the signal being transmitted to the solenoid 46. By way of example only, control of the voltage level transmitted to the solenoid 46 is accomplished by means of an electrical control system including a "main station", generally designated 47 and a "remote station", generally designated 49. The details of the circuitry within the stations 47 and 49 will be introduced in connection with the description of the operation of the invention.

OPERATION—FIG. 1

The hydraulic control system of FIG. 1 may be operated in either the manual mode, from the main station 47, or in the remote mode, from the remote station 49. Operation in the manual mode was described previously and is substantially unaffected by the inclusion of the present invention. During operation in the manual mode, the modulating valve 37 is biased to the position of unrestricted communication between the first port 39 and the second port 41, such that the system functions in the same manner as a prior art system, as described above.

When the operator wishes to operate the system in the remote mode, it is first necessary to move a "remote" switch element 51 from the "OFF" position to the "ON" position. The switch 51 is connected to a source of voltage V+, and is connected across a driver circuit 53 which is shown only schematically in FIG. 1. However, it is believed that the necessary circuitry within the driver circuit 53 would be obvious to one skilled in the art, based upon the description herein of the desired operation of the system.

When the switch 51 is moved to the "ON" position, the solenoid 46 is fully energized, moving the valve 37 to the lefthand position in which the first port 39 is isolated and communication between the second port 41 and third port 43 is substantially unrestricted. The handle 31 of the flow control valve 15 is then moved to a position corresponding to the maximum flow rate which will be required during operation in the remote mode. The result of the preceding steps is that the load signal pressure communicated to the compensator valve 29 is at substantially reservoir pressure, indicating no demand for fluid, and the pump 23 is destroked to a "standby" condition. With the output of the pump 23 at standby pressure, there is insufficient pressurized flow to actuate the cylinder 17, as though the flow control valve 15 were in the neutral position.

Control of the fluid flow rate to the cylinder 17 is accomplished in the remote mode by means of a variable potentiometer 55, including a movable wiper 57. When the operator arrives at the remote station it is first necessary to move the wiper 57 to a "zero" flow position on the potentiometer 55. Such movement of the wiper 57 closes an actuating switch 59, such that the source voltage V+ is transmitted to a relay coil 61, actuating a relay 63. Actuation of the relay 63 moves a relay holding contact 65 from the open position shown in FIG. 1 to the closed position, and moves a control contact 67 from the open position shown in FIG. 1 to the closed position.

With the control contact 67 in the closed position, it is possible to move the wiper 57 from the "zero" flow position to some other position on the potentiometer 55, corresponding to the desired flow rate. The generated flow command signal is transmitted from the wiper 57, across the contact 67 to a lead 69, connected to the driver circuit 53 in the main station 47. In the driver circuit, the generated flow command signal is appropriately modified (shaped, amplified, etc.) and transmitted to the solenoid 46 to actuate the modulating valve 37. Therefore, as the operator moves the wiper 57 from the "zero" flow position on the potentiometer 55 toward the "max." position, the modulating valve 37 moves from the lefthand position toward the righthand position. With a load imposed on the cylinder 17, the effect of this movement of the modulating valve 37 is to progressively increase the proportion of the load signal communicated from the load signal port 35 to the flow compensator vavle 29. For example, with the cylinder 17 subjected to a 1000 psi load, the fluid pressure at the load signal port 35 is 1000 psi. With the modulator valve 37 in the lefthand position, the load signal transmitted to the compensator valve 29 is approximately zero psi, which results in substantially zero fluid flow through the flow control valve 15. With the cylinder 17 still subjected to a 1000 psi load, as the modulating valve 37 moves progressively toward the righthand position, the size of the variable orifice 45 decreases, and the load signal communicated to the compensator valve 29 progressively increases. When the modulating valve 37 has reached the righthand position, the load signal communicated from the second port 41 to the flow compensator valve 29 has increased to substantially 1000 psi. This progressive increase in the load signal communicated to the load sensing pump 11 results in a progressive increase in the fluid flow rate through the variable orifice 33, and a progressive increase in the speed of actuation of the cylinder 17.

Thus, it may be seen that the present invention provides a means for remotely controlling the fluid flow rate through a conventional flow control valve without the need for expensive and sophisticated controls, solenoids, etc. As should be apparent to those skilled in the art, remote control of the solenoid 46 to move the modulating valve 37 and control the communication of a load signal requires much less force, and is therefore simpler and cheaper, than controlling the movement of a main directional flow control spool, which is subject to high flow forces. In addition, it may be seen that the novel concept disclosed herein of controlling a fluid flow rate by modulating the associated load signal provides a less complicated and less expensive interface between an hydraulic circuit and the electronic logic used to control the hydraulic circuit.

FIG. 2

Figure 2:
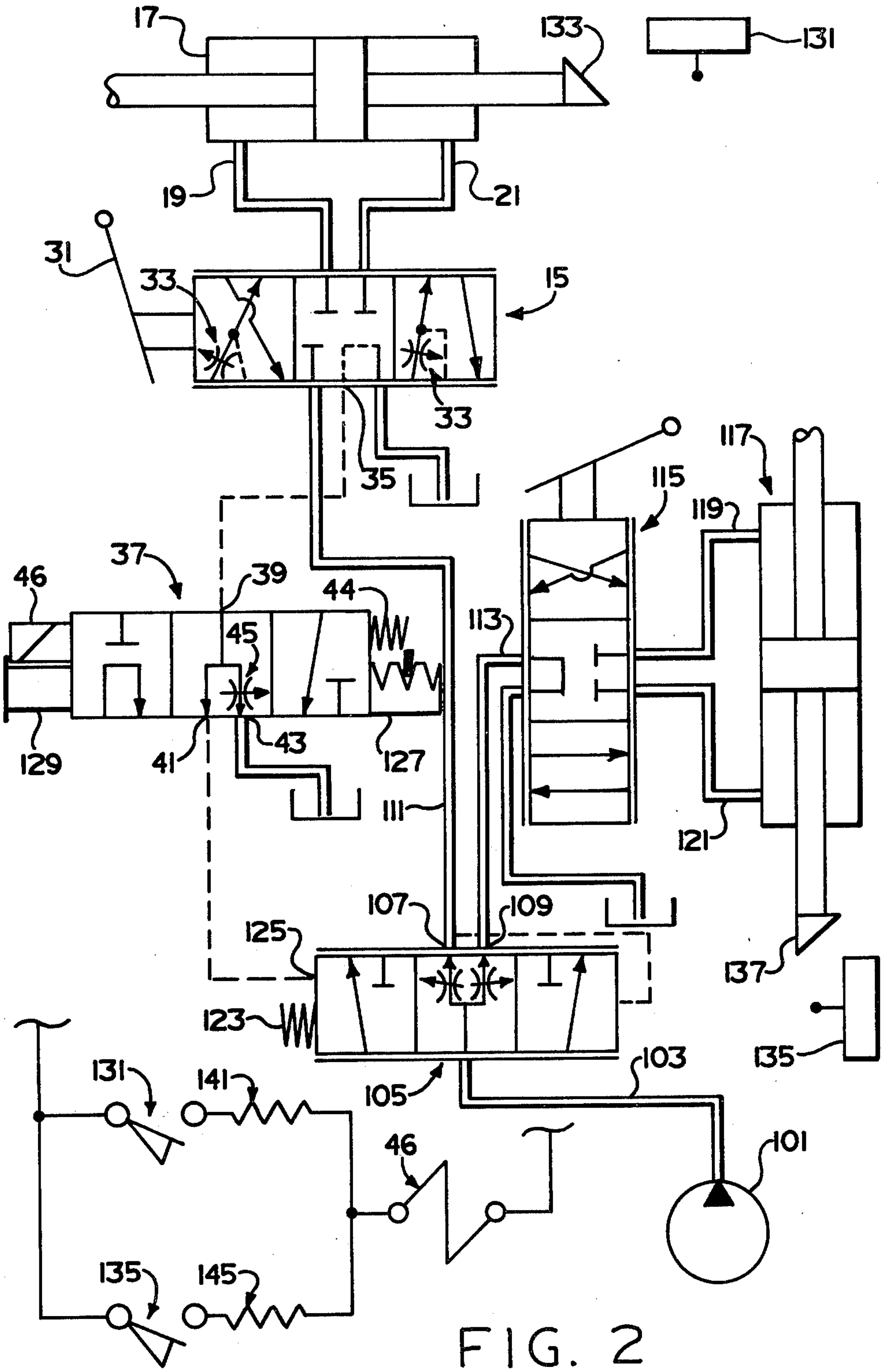
FIG. 2 is a schematic of an alternative embodiment of the invention, providing various forms of automatic control of an hydraulic system.

Referring now to FIG. 2, there is shown an alternative embodiment of the present invention which illustrates several uses of the present invention, other than remote control. In FIG. 2, elements which are substantially the same as those in FIG. 1 bear the same numerals, with new elements being assigned reference numerals above 100.

The system of FIG. 2 includes a fixed displacement pump 101 which pumps pressurized fluid through a conduit 103 to the inlet port of a load sensing, priority flow control valve, generally designated 105. The priority valve 105 may be of the type which is now well known in the art and which is illustrated in U.S. Pat. No. 3,455,210, assigned to the assignee of the present invention, and incorporated herein by reference. The priority valve 105 includes a controlled flow outlet port 107 and an auxiliary outlet port 109. The controlled flow outlet port 107 provides "priority flow" to a priority load circuit by means of a fluid conduit 111, while the auxiliary fluid port 109 communicates auxiliary (excess) fluid to an auxiliary load circuit by means of a fluid conduit 113.

The priority load circuit comprises the three position four way flow control valve 15 and the fluid actuated cylinder 17, described previously. The auxiliary load circuit includes a second three position, four way directional flow control valve, generally designated 115, which may be used to selectively communicate pressurized fluid from the conduit 113 to a fluid actuated cylinder 117, through either of a pair of fluid conduits 119 and 121.

The priority valve 105 is typically biased by a spring 123 toward a position permitting substantially unrestricted fluid communication from the conduit 103 to the controlled flow outlet port 107. Also biasing the priority valve 105 toward the position described above is the fluid pressure in a load signal chamber, indicated schematically by 125. In the conventional system, made in accordance with the teachings of the prior art, the load signal chamber 125 of the priority valve 105 would be in direct fluid communication with the load signal port 35 of the flow control valve 15. In accordance with the present invention, however, the load signal modulating valve 37 is interposed in the fluid conduit connecting the load signal port 35 and the load signal chamber 125, in the same general manner as described in connection with FIG. 1. In the embodiment of FIG. 2, in order to illustrate the versatility of the present invention, the modulating valve 37 is shown as having three discrete positions, rather than being infinitely variable as in FIG. 1. The modulating valve 37 of FIG. 2 includes a detent mechanism, indicated schematically at 127, and a manual override button, indicated at 129, the use of which will be described in more detail subsequently.

Associated with the fluid cylinder 17 is a travel limit switch 131, which is actuated by a cam member 133, attached to the rod of the cylinder 17. Similarly, associated with the fluid cylinder 117 is a travel limit switch 135, which is actuated by a cam member 137 attached to the rod of the cylinder 117. As shown by the electrical line diagram near the bottom of FIG. 2, the limit switch 131 is in series with a resistor 141 and the limit switch 135 is in series with a resistor 145, with the two described series circuits being connected in parallel to the coil of the proportional solenoid 46. In the subject embodiment, the resistance value of the resistor 141 is approximately twice that of the resistor 145, for reasons which will be described subsequently.

OPERATION—FIG. 2

Under normal operating conditions of the system of FIG. 2, the modulating valve 37 is in the righthand position, permitting substantially unrestricted fluid communication between the first port 39 and the second port 41, while isolating the third port 43. During normal operation, neither of the limit switches 131 or 135 is actuated (closed), and the system functions in the manner of a conventional priority-auxiliary hydraulic circuit as described in the above-incorporated U.S. Pat. No. 3,455,210. In describing the operation of the system illustrated in FIG. 2, three different conditions will be considered.

The first condition occurs when the cam member 133 engages the limit switch 131, for example, when the cylinder 17 approaches the end of its stroke. Actuation of the switch 131 provides a completed electrical path through the resistor 141 to energize the coil of the solenoid 46. Because of the relatively higher resistance of the resistor 141, the voltage drop across the solenoid 46 is relatively smaller, and the modulating valve 37 moves to the intermediate position illustrated in FIG. 2. With the modulating valve 37 in the intermediate position, a portion of the load signal is communicated through a variable orifice 45 and the third port 43 to tank, thus reducing the level of the load signal being communicated to the load signal chamber 125. For example, with a load of 1000 psi imposed on the cylinder 17, the pressure at the load signal port 35 is also 1000 psi, but with the modulating valve 37 in the intermediate position, the load signal at the second port 41 and the load signal chamber 125 may be only 500 psi, by way of example.

The result of the reduced load signal present in the chamber 125 is a shifting of the priority valve 105 toward the left in FIG. 2, reducing the fluid flow rate of the priority circuit, and increasing the amount of fluid available to the auxiliary load circuit. Thus, it may be seen that, in the first condition, the present invention provides a means for automatically shifting from a "coarse" control range to a "fine" control range of the flow control valve 15, without the need for operator intervention or movement of the flow control 15. This would permit smoother starting or stopping of a fluid motor or cylinder.

The second condition occurs when the cam member 137 engages the limit switch 135, for example, when the cylinder 117 approaches a position which is undesirable, or which represents a safety hazard for the associated mechanism. Actuation of the switch 135 provides a completed electrical path through the resistor 145 to energize the coil of the solenoid 46. Because of the relatively lower resistance of the resistor 145, the voltage drop across the solenoid 46 is relatively greater, and the modulating valve 37 moves to the lefthand position in which the first port 39 is isolated, while the second port 41 is in substantially unrestricted communication with the third port 43. The level of the load signal communicated to the load signal chamber 125 becomes substantially zero psi, indicating to the priority valve 105 a "lack of demand" by the cylinder 17, permitting the auxiliary load circuit to effectively be given priority temporarily, under certan predetermined conditions.

The third condition occurs when the operator senses, visually or by means of an audible signal, etc., that it is necessary to "override" the settings of the flow control valves 15 and 115, and the normal priority-auxiliary relationship thereof. If, for example, the operator senses the need to give priority to the auxiliary load circuit momentarily, he may depress the manual override button 129, moving the modulating valve 37 to the lefthand position, with the same result as described in connection with the second condition. Alternatively, the manual override button 129, instead of being directly depressed by the operator, could be depressed indirectly. By way of example, if the priority load circuit were the vehicle sterring system, and the auxiliary load circuit were the vehicle brake system, full depression of the brake pedal, as in an emergency braking situation, could actuate the manual override 129 to give the braking system momentary priority.

Thus, it may be seen from the system shown in FIG. 2 that the present invention permits a load sensing hydraulic system to be "pre-programmed" to respond automatically, and in a predetermined manner, to a number of different conditions, either within the system, or external to the system.

FIG. 3

Figure 3:
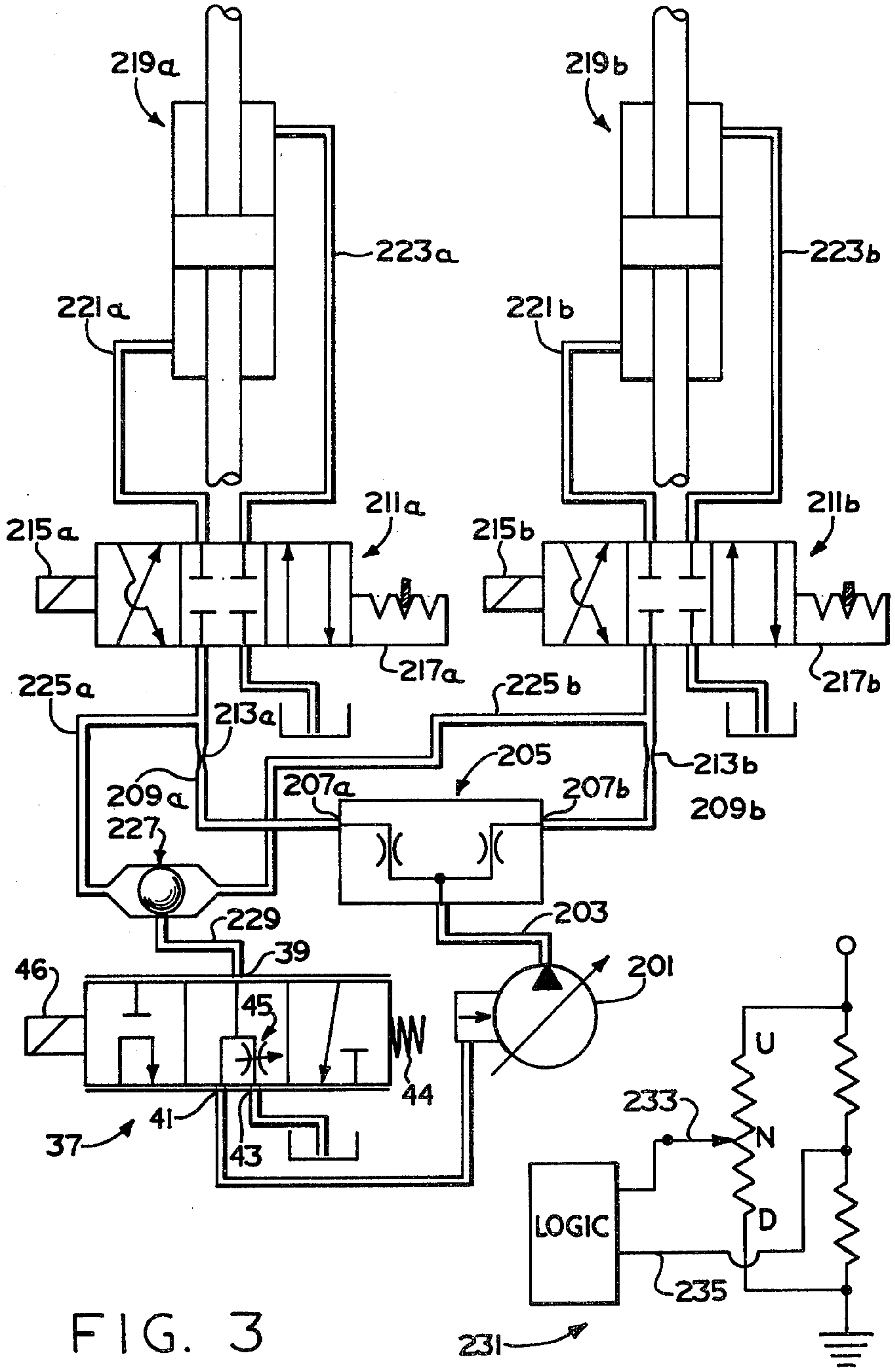
FIG. 3 is a schematic of another alternative embodiment of the present invention in which a pair of hydraulic circuits are operated in synchronism.

Referring now to FIG. 3, there is shown an alternative embodiment of the present invention which illustrates the use of the invention to accomplish full-time flow control in response to changes in an electrical input signal. In FIG. 3, elements which are substantially the same as those in FIG. 1 bear the same numerals, with new elements being assigned reference numerals above 200.

The system of FIG. 3 includes a variable displacement pump 201 which pumps pressurized fluid through a conduit 203 to the inlet port of a flow divider valve, generally designated 205. The flow divider valve 205 may be of the type which is now well known in the art, and commercially available, and which divides an input flow into a pair of substantially equal output flows. The flow divider valve 205 includes a pair of outlet ports **207*a* and 207*b***, which are connected to a pair of load circuits which are intended to operate in synchronization. Because the two load circuits are substantially identical, only one will be described in detail.

Connected to the outlet port **207*a* is a fluid conduit 209*a*, having its other end connected to the inlet port of a three position, four way directional valve, generally designated 211*a*. Disposed in the fluid conduit 209*a* is a fixed orifice 213*a*, which is used to provide flow control, as will be described subsequently. In the embodiment of FIG. 3, the position of the directional control valve 211*a* is controlled solely by a porportional solenoid 215*a* and a detent mechanism 217*a***.

The outlet ports of the directional control valve **211*a* are connected to the opposite ends of a fluid cylinder 219*a* by a pair of fluid conduits 221*a* and 223*a*. In fluid communication with the fluid conduit 209*a*, and downstream of the fixed orifice 213*a*, is a load signal conduit 225*a*. The two load signal conduits 225*a* and 225*b* are connected to a shuttle valve 227 which communicates the higher of the two load signals, if they differ slightly, to a load signal conduit 229**.

The load signal conduit 229 is connected to the first port 39 of the load signal modulating valve 37. In the FIG. 3 embodiment, the modulating valve 37 is illustrated as being infinitely variable, and is biased toward the righthand position by the spring 44. Movement of the modulating valve 37 in opposition to the biasing force of the spring 44 is accomplished by the electrically actuated proportional solenoid 46, as described in connection with the embodiment of FIG. 1. The voltage level of the signal being transmitted to the solenoid 46, and thus, the position of the modulating valve 37 is controlled by an electrical control circuit, generally designated 231. The control circuit 231 includes a command signal generator portion and a logic portion. The command signal generator portion includes a command wiper 233 and a reference lead 235. Command signal generators of the type illustrated are generally well known in the art, such that no further description thereof is needed, and it is believed that an operable logic portion would be obvious to one skilled in the art from the subsequent description of the operation of the FIG. 3 embodiment.

OPERATION—FIG. 3

When the wiper 233 is in the neutral (N) position, such that the signals transmitted by the wiper 233 and lead 235 are equal, both of the directional control valves **211*a* and 211*b*** are in the neutral positions shown in FIG.

3, and the modulating valve 37 is biased by the solenoid 46 toward the lefthand position in which the second port 41 is in unrestricted fluid communication with the third port 43 and the variable displacement pump 201 is at substantially zero stroke.

When it is desired to actuate the load circuits, for example, raising the cylinders 219*a* and 219*b*, the wiper 233 is moved toward the upward (U) position. The logic portion senses that the wiper 233 is transmitting a higher voltage than is the lead 235, and transmits to the solenoids 215*a* and 215*b* identical signals of an appropriate voltage to move the directional valves 211*a* and 211*b* to their righthand positions, in which pressurized fluid is communicated from the conduits 209*a* and 209*b* to the conduits 221*a* and 221*b*, respectively.

At the same time, the logic portion senses the difference in magnitude between the signals transmitted by the wiper 233 and the reference lead 235, this difference being proportional to the movement of the wiper 233 from neutral (N) and being indicative of the desired fluid flow rate. The logic portion transmits a signal to the proportional solenoid 46 to position the modulating valve 37 appropriately, as described previously, to accomplish the desired output flow rate from the pump 201 through the flow divider valve 205 and the fixed orifices 213*a* and 213*b* to the cylinders 219*a* and 219*b*, respectively.

Thus, it may be seen that the present invention also provides control of one or more load circuits, in response to changes in an electrical command signal, in which the electrical signal can command both direction and flow rate and thus, could operate on an entirely automatic basis.

Although the present invention has been illustrated in a largely schematic manner, it is believed to be within the ability of those skilled in the art to design the load signal modulating valve 37, select the appropriate range of sizes for the orifice 45, select the proportional solenoid 46 and associated mechanism for establishing the position of the valve 37, and match the valve 37 with various other system components, such as the directional flow control valve.

It will be understood by those skilled in the art that the particular embodiments of the present invention illustrated and described herein have been selected partly to illustrate the versatility of the present invention, and not to limit the scope of the appended claims. Partly by way of summary, it should be noted that the invention is illustrated in systems utilizing a load sensing pump, and a fixed displacement pump, and in systems for actuating a single load circuit, a pair of load circuits in a priority-auxiliary relationship, and a pair of load circuits in synchronism. Furthermore, the invention is illustrated in a system in which control may be accomplished either locally or remotely by an operator (and either manually or electrically), as well as one in which control is purely electrical, with or without an operator. The load signal modulating valve 37 is illustrated as being either infinitely variable or having a series of discrete positions and is shown as being actuatable both electrically and manually. By way of a final example, the invention is shown in a system in which both flow and direction control are accomplished in a single valve (15), and in another system in which the flow and directional control are accomplished independently (213, 211).

Therefore, because modifications and alterations of the preferred embodiments will occur to others upon a reading and understanding of the specification, it is my intention to include all such modifications and alterations as part of my invention insofar as they come within the scope of the appended claims.

What is claimed is:

1. In a system for controlling the flow of fluid from a variable fluid delivery source to a fluid actuated device, the system including main control means disposed in series flow relationship between the fluid source and the fluid actuated device, the main control means including a main flow orifice, the flow through the main control means normally being a function of the area of the main flow orifice, the pressure drop across the main flow orifice normally being substantially constant, the variable fluid delivery source including a load signal chamber and means responsive to changes in the fluid pressure within the load signal chamber to vary the delivery of the fluid source, the system further including means providing a load signal representative of the load on the fluid actuated device, and means communicating the load signal to the load signal chamber, the improvement comprising:

valve means disposed within said load signal communicating means, said valve means including a first port in fluid communication with said load signal providing means, a second port in fluid communication with said load signal chamber, and a third port in fluid communication with a source of reference fluid, said valve means including a movable valve member having a first position permitting fluid communication between said first and second ports and isolating said third port, said movable valve member having at least one position permitting partial fluid communication between said first port and said second port and between said first port and said third port, the movement of said movable valve member being independent of the operation of the main control means.

2. The improvement as claimed in claim 1 wherein said movable valve member has a second position permitting fluid communication between said second and third ports and isolating said first port, whereby the pressure in said load signal chamber is substantially equal to said source of reference fluid.

3. The improvement as claimed in claim 2 wherein the position of said movable valve member is infinitely variable between said first and second positions whereby the pressure in said load signal chamber is infinitely variable between the load signal pressure and the reference fluid pressure, respectively.

4. The improvement as claimed in claim 1 wherein said variable fluid delivery source includes a fluid pump and a priority flow control valve having an inlet port connected to the outlet of the fluid pump, a priority outlet port in fluid communication with the fluid actuated device, and an auxiliary outlet port in fluid communication with an auxiliary load circuit.

5. The improvement as claimed in claim 4 wherein said priority flow control valve includes a movable valve spool operable to control the flow of fluid from said inlet port to said outlet ports, and means biasing said valve spool toward a position permitting substantially unrestricted fluid communication from said inlet port to said priority outlet port.

6. The improvement as claimed in claim 5 wherein said biasing means includes the fluid pressure in said load signal chamber.

7. The improvement as claimed in claim 1 including means receiving an electrical input signal and means responsive to said input signal to move said valve member to said first position when said input signal has a first value and to said one position when said input signal has another value.

8. The improvement as claimed in claim 3 including means receiving an electrical input signal and means responsive to said input signal to move said valve member between said first and second positions as said electrical input signal varies between a first value and a second value, respectively.

9. The improvement as claimed in claim 1 wherein said movable valve member has a plurality of positions permitting partial fluid communication between said first port and said second port, and between said first port and said third port, said plurality of positions providing successively lesser amounts of restriction to fluid flow from said first port to said third port.

10. In a system for controlling the flow of fluid from a variable fluid delivery source to a fluid actuated device, the system including main control valve means operable to determine the rate and direction of fluid flow, the variable fluid delivery source including a load signal chamber and means responsive to changes in the fluid pressure within the load signal chamber to vary the delivery of the fluid source, the system further including means providing a load signal representative of the load on the fluid actuated device, and means communicating the load signal to the load signal chamber, the improvement comprising:

valve means disposed in series flow relationship within said load signal communicating means, said valve means including a first port in fluid communication with said load signal providing means, a second port in fluid communication with said load signal chamber, and a third port in fluid communication with a source of reference fluid pressure, said valve means including a movable valve member having a first position permitting fluid communication between said first and second ports and isolating said third port, said movable valve member being infinitely variable from said first position toward a second position permitting fluid communication between said second port and said third port, the fluid pressure communicated to said load signal chamber being substantially equal to the fluid pressure at said first port when said valve member is in said first position, the fluid pressure at said second port progressing toward said reference fluid pressure as said valve member moves toward said second position.

11. The improvement as claimed in claim 10 including means receiving an electrical input signal and means responsive to said input signal to move said valve member from said first position toward said second position as said electrical input signal varies from a first value toward a second value.

* * * * *